(12) United States Patent
Thornburg

(10) Patent No.: US 11,378,040 B2
(45) Date of Patent: Jul. 5, 2022

(54) SWIRL PREBURNER SYSTEM AND METHOD

(71) Applicant: Stratolaunch, LLC, Mojave, CA (US)

(72) Inventor: Jeffery Tyler Thornburg, Madison, AL (US)

(73) Assignee: Stratolaunch, LLC, Mojave, CA (US)

(*) Notice: Subject to any disclaimer, the term of this patent is extended or adjusted under 35 U.S.C. 154(b) by 532 days.

(21) Appl. No.: 16/192,693

(22) Filed: Nov. 15, 2018

(65) Prior Publication Data
US 2020/0158049 A1    May 21, 2020

(51) Int. Cl.
| | |
|---|---|
| F02K 9/52 | (2006.01) |
| F02K 3/075 | (2006.01) |
| F02K 9/48 | (2006.01) |
| F02K 9/64 | (2006.01) |
| F23R 3/20 | (2006.01) |

(52) U.S. Cl.
CPC ............. F02K 9/52 (2013.01); F02K 3/075 (2013.01); F02K 9/48 (2013.01); F02K 9/64 (2013.01); F23R 3/20 (2013.01)

(58) Field of Classification Search
CPC ............... F02K 9/52; F02K 9/64; F02K 9/48
See application file for complete search history.

(56) References Cited

U.S. PATENT DOCUMENTS

| | | | | |
|---|---|---|---|---|
| 2,520,751 A | * | 8/1950 | Zucrow ............. | F02K 9/64 60/260 |
| 3,132,481 A | * | 5/1964 | Hasbrouck ......... | F02K 9/52 60/258 |
| 3,169,368 A | * | 2/1965 | Munding ........... | E21B 7/14 60/258 |
| 3,383,862 A | * | 5/1968 | Novotny ............ | F02K 9/52 60/258 |
| 4,438,742 A | * | 3/1984 | Namba .............. | F02B 31/08 123/308 |

(Continued)

FOREIGN PATENT DOCUMENTS

| | | |
|---|---|---|
| CN | 103672968 A | 3/2014 |
| DE | 363452 C | 11/1922 |

(Continued)

OTHER PUBLICATIONS

International Search Report and Written Opinion dated Feb. 11, 2020, International Patent Application No. PCT/US2019/061774, filed Nov. 15, 2019, 13 pages.

(Continued)

*Primary Examiner* — Lorne E Meade
(74) *Attorney, Agent, or Firm* — Davis Wright Tremain LLP

(57) ABSTRACT

A swirl preburner having a first swirl core defining a first swirl chamber having a first swirl chamber first end and a first swirl chamber second end. The swirl preburner further includes a second swirl core defining a second swirl chamber having a second swirl chamber first end and a second swirl chamber second end. The swirl preburner also includes a mixing element defining a mixing chamber, the mixing chamber surrounding a portion of the first and second chamber at least including the first chamber second end and the second chamber second end.

20 Claims, 7 Drawing Sheets

(56) References Cited

U.S. PATENT DOCUMENTS

| | | | | | |
|---|---|---|---|---|---|
| 5,251,823 | A | * | 10/1993 | Joshi | F23D 11/107 |
| | | | | | 239/401 |
| 5,404,715 | A | * | 4/1995 | Vuillamy | F02K 9/48 |
| | | | | | 60/257 |
| 5,660,039 | A | * | 8/1997 | Sion | B01F 5/0453 |
| | | | | | 239/424 |
| 6,502,385 | B2 | * | 1/2003 | Haeseler | B01F 5/0453 |
| | | | | | 239/424 |
| 6,918,243 | B2 | * | 7/2005 | Fisher | F02K 9/42 |
| | | | | | 60/211 |
| 7,900,435 | B1 | * | 3/2011 | Greason | F02K 9/52 |
| | | | | | 60/258 |
| 9,200,596 | B2 | * | 12/2015 | Fowler | F02K 9/68 |
| 9,528,479 | B2 | * | 12/2016 | Le Cras | F02M 43/04 |
| 2015/0292439 | A1 | * | 10/2015 | Taliercio | F02K 9/52 |
| | | | | | 239/404 |

FOREIGN PATENT DOCUMENTS

| | | | |
|---|---|---|---|
| EP | 2194322 | A1 | 6/2010 |
| FR | 3007801 | A1 | 1/2015 |
| WO | 2007081816 | A2 | 7/2007 |

OTHER PUBLICATIONS

Office Action for Chinese Application No. 201980075383X, dated Apr. 21, 2022, 16 pages.

* cited by examiner

SWIRL PREBURNER SYSTEM AND METHOD

BACKGROUND

Components of rocket engines can be temperature sensitive such that exposure to high temperatures over time will cause temperature-sensitive elements to fail. Accordingly, limiting or removing the exposure of such elements to damaging high temperatures can increase the life span and reusability of a rocket engine.

Combustion in a preburner is one source of heat that can potentially be damaging to rocket engine parts such as downstream turbines or the preburner itself. In some examples, inefficient mixing of fuel and oxidizer in the preburner can result in combustion temperatures occurring over a large range, which can include temperatures that can be damaging to elements of the rocket engine.

Accordingly, preburner systems that provide for efficient mixing of fuel and oxidizer can be beneficial for extending the working life of a rocket engine. Additionally, preburner systems that provide for efficient cooling of combustion products can allow shorter connectors between a preburner and turbine, which can decrease the size and mass of a rocket engine.

Figure 1:
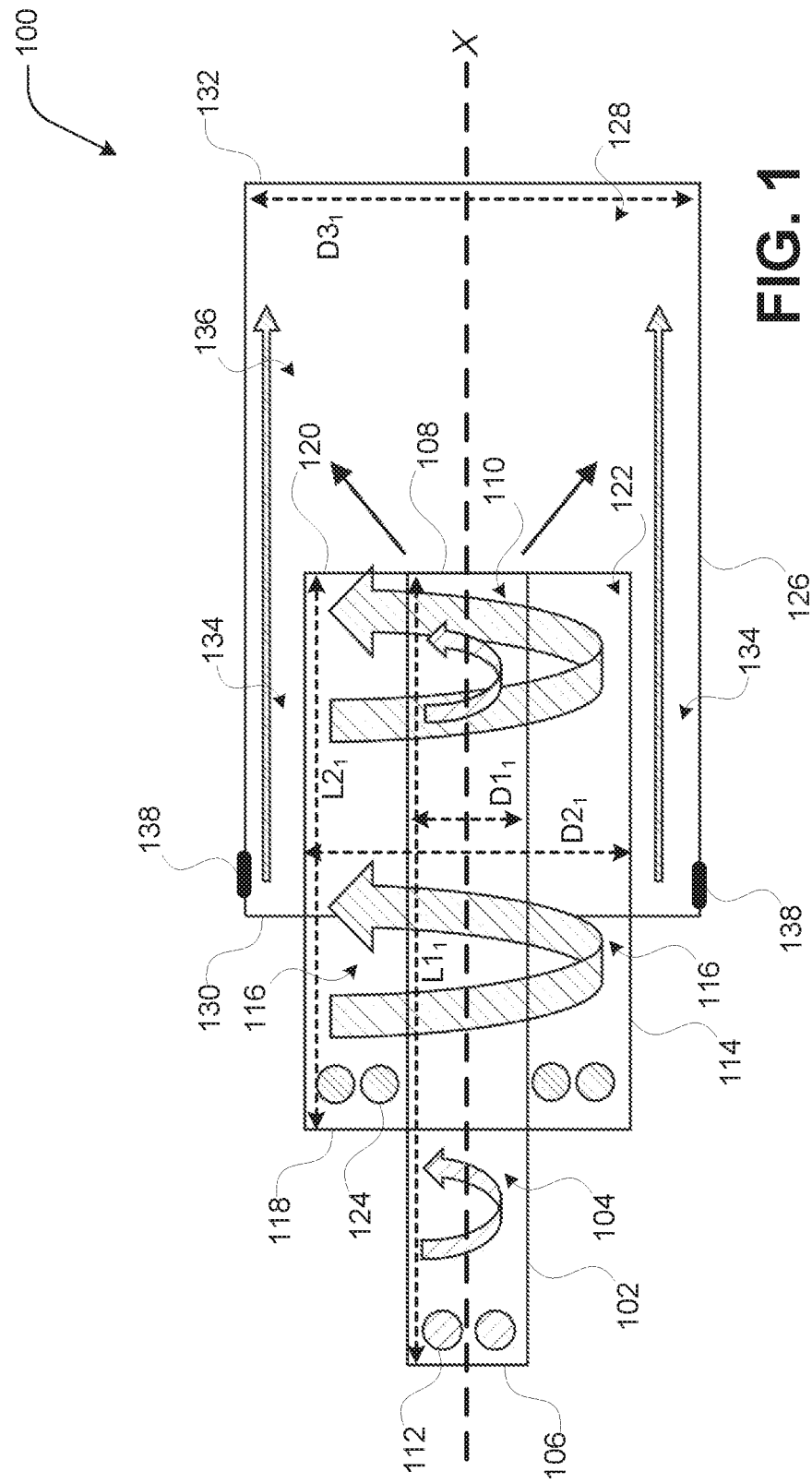
FIG. 1 is an example cross-sectional side view of a swirl preburner in accordance with an embodiment.

It should be noted that the figures are not drawn to scale and that elements of similar structures or functions are generally represented by like reference numerals for illustrative purposes throughout the figures. It also should be noted that the figures are only intended to facilitate the description of the example embodiments. The figures do not illustrate every aspect of the described embodiments and do not limit the scope of the present disclosure.

DETAILED DESCRIPTION

The following disclosure relates to rocket engines, including a preburner that can be part of a rocket engine. The disclosure includes a method of operating a swirl preburner that includes introducing a first fluid into a first swirl chamber defined by a first swirl core of the swirl preburner. The first fluid can be introduced at a first swirl chamber first end and can generate a first fluid flow that propagates toward a first swirl chamber second end, with the first swirl chamber second end defining a first swirl chamber exit port. The first fluid flow can swirl within the first swirl chamber from the first swirl chamber first end to the first swirl chamber second end.

The method of operating a swirl preburner can also include introducing a second fluid into a second swirl chamber defined by a second swirl core of the swirl preburner. The second fluid can be introduced at a second swirl chamber first end and can generate a second fluid flow that propagates toward a second swirl chamber second end, with the second swirl chamber second end defining a second swirl chamber exit port. The second fluid flow can swirl within the second swirl chamber from the second swirl chamber first end to the second swirl chamber second end, with the second swirl chamber surrounding a portion of the first swirl chamber including at least the first swirl chamber second end.

The method of operating a swirl preburner can also further include introducing a third fluid into a mixing chamber defined by a mixing element. The mixing chamber can surround a portion of the first and second swirl chambers at least including the first swirl chamber second end and the second swirl chamber second end, with the first and second fluid flow leaving the first and second swirl chamber into the mixing chamber and mixing within the mixing chamber.

At least the first fluid flow and the second fluid flow can be ignited within the mixing chamber to generate a combustion, and the combustion products can be used to drive a turbine that drives one or more fluid pumps that pump the first, second and third fluids to the swirl preburner.

In various examples, the swirling flow of the first and second fluid generated in the first and second swirl chambers can provide improved mixing of the first and second fluid, which can result in combustion that occurs within a narrower temperature range, which can be beneficial for temperature sensitive elements downstream of the preburner, including the blades of a downstream turbine.

Turning to FIG. 1, a swirl preburner 100 is shown comprising a first swirl core 102 that defines a first swirl chamber 104 extending from a first swirl chamber first end 106 to a first swirl chamber second end 108 with a length of $L1_1$. The first swirl chamber 104 comprises a first swirl chamber exit port 110 at the first swirl chamber second end 108. In various embodiments, the first swirl core 102 defines a cylindrical first swirl chamber 104 having a diameter of $D1_1$. A plurality of first swirl chamber injection ports 112 can be defined by the first swirl core 102 and disposed at the first swirl chamber first end 106.

In various embodiments, a first fluid can be injected into the first swirl chamber 104 via the first swirl chamber injection ports 112, with the first swirl chamber injection ports 112 being configured to generate a swirl of the first fluid within the first swirl chamber 104 that propagates from the first swirl chamber first end 106 to the first swirl chamber second end 108 and out of the first swirl chamber exit port 110. In some embodiments, the first fluid can comprise liquid oxygen (LO2).

The swirl preburner 100 is shown further comprising a second swirl core 114 that defines a second swirl chamber 116 extending from a second swirl chamber first end 118 to a second swirl chamber second end 120 with a length of $L2_1$. The second swirl chamber 116 comprises a second swirl chamber exit port 122 at the second swirl chamber second end 120. In various embodiments, the second swirl core 114 defines a cylindrical-ring second swirl chamber 116 having a diameter of $D2_1$, with the second swirl chamber 116 encircling the first swirl chamber 104 (see e.g., FIG. 2). Accordingly, a portion of the first swirl core 102 can define a portion of the second swirl chamber 116.

Additionally, as shown in the example of FIG. 1, the first swirl chamber second end 108 and second swirl chamber second end 120 can be flush with each other and define a common face. The second swirl chamber 116 can extend about the first swirl chamber 104 from the first swirl chamber second end 108 toward first swirl chamber first end 106 the length of $L2_1$. Accordingly, the distance between the first swirl chamber first end 106 and second swirl chamber first end 118 is a distance of $L1_1$-$L2_1$ with the first swirl chamber first end 106 not being encircled by the second swirl chamber 116.

A plurality of second swirl chamber injection ports 124 can be defined by the second swirl core 114 and disposed at the second swirl chamber first end 118. In various embodiments, a second fluid can be injected into the second swirl chamber 116 via the second swirl chamber injection ports 124, with the second swirl chamber injection ports 124 being configured to generate a swirl of the second fluid within the second swirl chamber 116 that propagates from the second swirl chamber first end 118 to the second swirl chamber second end 120 and out of the second swirl chamber exit port 122. In some embodiments, the second fluid can comprise liquid hydrogen (LH2).

As illustrated in FIG. 1, the first and second fluids can generate a swirl in the same direction within the respective first and second swirl chambers 104, 116. However, in some examples, the first and second fluids can generate a swirl in the opposite direction within the respective first and second swirl chambers 104, 116. Additionally, in further embodiments, one or both of the first and second fluids can propagate within the respective first and second swirl chambers 104, 116 without a swirl.

In various embodiments, a swirl of the first and/or second fluid can be generated by configuration of the one or more respective first swirl chamber injection ports 112 and second swirl chamber injection ports 124, which can include holes that provide a tangential feed of fluid into the respective first and second swirl chambers 104, 116. For example, one or more first swirl chamber injection ports 112 can be defined by the first swirl core 102, with the first swirl chamber injection ports 112 providing a feed of the first fluid that is tangential to the internal surface of the first swirl core 102 defining the first swirl chamber 104. Such a configuration can generate a swirl or helical flow of the first fluid within the first swirl chamber 104 that propagates from the one or more first swirl chamber injection ports 112 at the first swirl chamber first end 106 toward the first swirl chamber second end 108 and out the first swirl chamber exit port 110.

The first swirl core 102 can comprise one or any suitable plurality of first swirl chamber injection ports 112. In some examples, the first swirl core 102 can comprise two to eight first swirl chamber injection ports 112. In one example, the first swirl core 102 can comprise three first swirl chamber injection ports 112.

In various examples, a plurality of first swirl chamber injection ports 112 can be symmetrically disposed and/or equally spaced around a circumference of the first swirl chamber 104 at the first swirl chamber first end 106. In some examples, the first swirl chamber injection ports 112 can be disposed in a common plane about a circumference of the first swirl chamber 104 and/or can be disposed symmetrically about a given plane.

Similarly, one or more second swirl chamber injection ports 124 can be defined by the second swirl core 114, with second swirl chamber injection ports 124 providing a feed of the second fluid that is tangential to the internal surface of the second swirl core 114 defining the second swirl chamber 116. Such a configuration can generate a swirl or helical flow of the second fluid within the second swirl chamber 116 that propagates from the one or more second swirl chamber injection ports 124 at the second swirl chamber first end 118 toward the second swirl chamber second end 120 and out the second swirl chamber exit port 122.

The second swirl core 114 can comprise one or any suitable plurality of second swirl chamber injection ports 124. In some examples, the second swirl core 114 can comprise four to sixteen second swirl chamber injection ports 124. In one example, the second swirl core 114 can comprise six second swirl chamber injection ports 124.

In various examples, a plurality of second swirl chamber injection ports 124 can be symmetrically disposed and/or equally spaced about a circumference of the second swirl chamber 116 at the second swirl chamber first end 118. In some examples, the second swirl chamber injection ports 124 can be disposed in a common plane about a circumference of the second swirl chamber 116 and/or can be disposed symmetrically about a given plane.

The number of first and second swirl chamber injection ports 112, 124 can be selected based on various factors. For example, in some embodiments, the number of first and/or second swirl chamber injection ports 112, 124 can be selected based on a mass flow requirement for the swirl preburner 100; an anticipated pressure drop through the first and second swirl chamber injection ports 112, 124; a smallest size that can be effectively manufactured, and the like. In some examples, a pressure drop for the first and/or second swirl chamber injection ports 112, 124 can be 15% to 20%. For example a 15% pressure drop can be calculated as 15% of the chamber pressure of the swirl preburner 100. Such a pressure drop range can be desirable for maintaining a desired stiffness for longitudinal combustion stability of the combustion process in respective elements of the swirl preburner 100.

The swirl preburner 100 can further comprise a mixing element 126 that defines a mixing chamber 128, with the mixing chamber 128 extending from a mixing chamber first end 130 to a mixing chamber second end 132. The mixing chamber 128 comprises a diluent injection portion 134 and a mixing cup 136. The mixing cup 136 defines a diameter of $D3_1$. The mixing element 126 further comprises a plurality of diluent injection ports 138 defined by the mixing element 126 at the mixing chamber first end 130.

In various embodiments, a third fluid can be injected into the diluent injection portion 134 of the mixing chamber 128 via the diluent injection ports 138, with the diluent injection ports 138 being configured to generate an envelope of the third fluid within the diluent injection portion 134 that propagates from the mixing chamber first end 130 and into the mixing cup 136 toward the mixing chamber second end 132 as shown in FIG. 1. In some examples, the third fluid can comprise liquid hydrogen (LH2).

Figure 2:
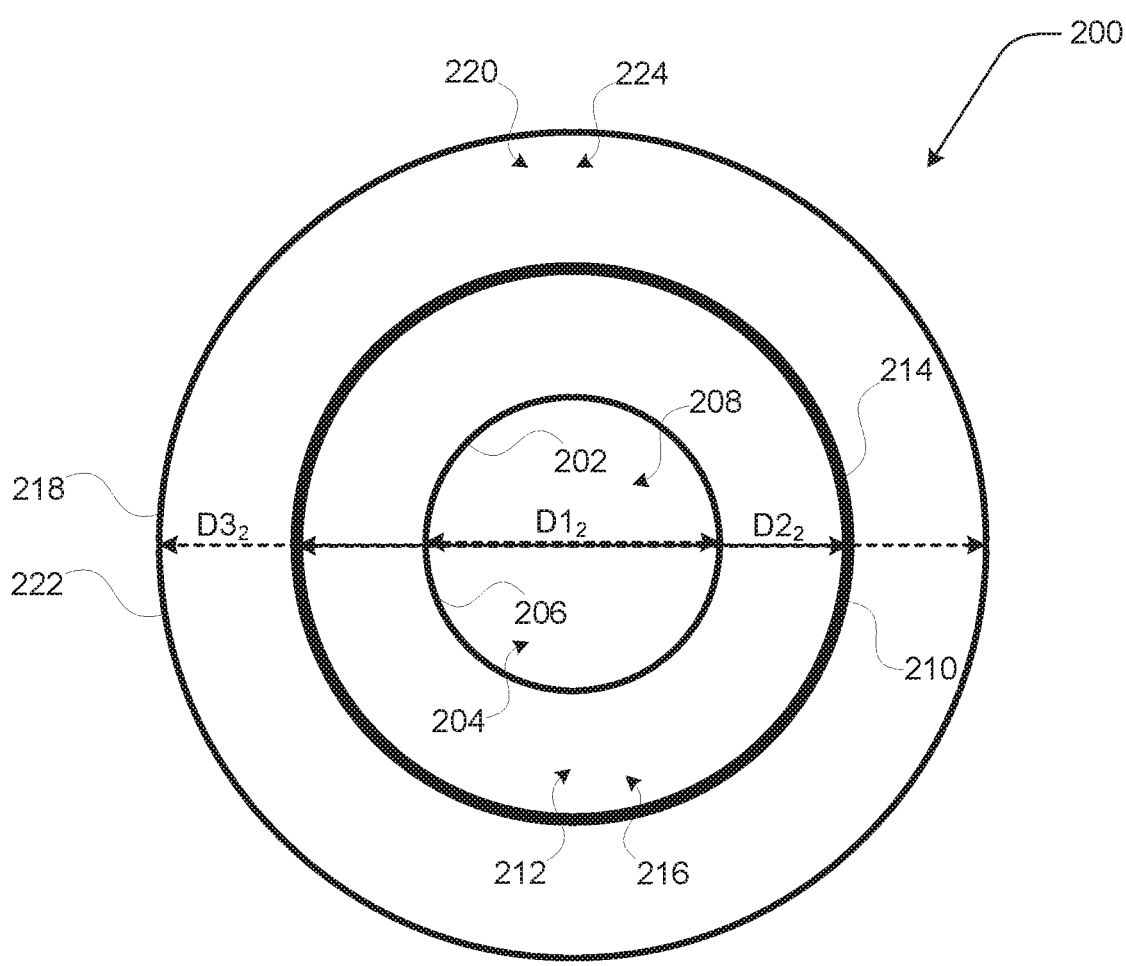
FIG. 2 is an example cross-sectional front view of a swirl preburner in accordance with an embodiment.

In various examples, the diluent injection portion 134 of the mixing chamber 128 defines a cylindrical ring with the diluent injection portion 134 encircling the first and second swirl chamber 104, 116 (see e.g., FIG. 2). Accordingly, a portion of the second swirl core 114 can define a portion of the diluent injection portion 134 of the mixing chamber 128.

As illustrated in FIG. 1, the first swirl core 102 can be nested within the second swirl core 114, with the first and second swirl core 102, 114 being nested within a portion of the mixing element 126. As discussed herein, the first and second swirl chambers 104, 116 and mixing cup 136 can define respective diameters $D1_1$, $D2_1$ and $D3_1$, with $D1_1 < D2_1 < D3_1$. Additionally, first and second swirl chambers 104, 116 and mixing chamber 128 can be axial symmetric and/or have circular radial symmetry about axis X that extends through the swirl preburner 100.

Swirling flows of first and second fluids can be respectively generated in the first and second swirl chambers 104, 116 as discussed above, and these respective flows of the first and second fluids can exit the first and second swirl chambers 104, 116 via the first and second swirl chamber exit ports 110, 122 into the mixing cup 136 of the mixing chamber 128. The first and second fluid swirl flows can be surrounded by an envelope of the third fluid coming from the diluent injection portion 134 and propagate toward the mixing chamber second end 132.

As discussed herein, the swirling flows of the first and second fluids can be generated by the angle, orientation, nozzle shape, or other configuration of the first and second swirl chamber injection ports 112, 124, which generates a respective fluid flow that in some examples, makes at least a full rotation, at least two full rotations, at least three full rotations, or the like, about the circumference of the respective first and second swirl chambers 104, 116. In contrast, the diluent injection ports 138 can be configured to generate a flow of the third fluid from the mixing chamber first end 130 toward the mixing chamber second end 132 without a swirling flow, which in some examples can include a linear flow, or a flow having a swirl flow that makes less than a full rotation about the circumference of the mixing chamber 128, including less than a half rotation, less than a quarter rotation, less than an eighth rotation, less than a sixteenth rotation, and the like.

In some examples, the mixing chamber 128 can comprise six to thirty-two diluent injection ports 138. In one example, the mixing chamber 128 can comprise twelve diluent injection ports 138.

In various examples, a plurality of diluent injection ports 138 can be symmetrically disposed and/or equally spaced about a circumference of the mixing chamber 128 at the mixing chamber first end 130. In some examples, the diluent injection ports 138 can be disposed in a common plane about a circumference of the mixing chamber 128 and/or can be disposed symmetrically about a given plane.

Although some examples include a LO2 swirl flow generated within the first swirl chamber 104, a LH2 swirl flow generated within the second swirl chamber 116, and a LH2 curtain or envelope flow generated within the diluent injection portion 134 of the mixing chamber 128, further fluids or configurations of fluids can be present in alternative example embodiments. For example, in another embodiment, a LH2 swirl flow can be generated within the first swirl chamber 104, a LO2 swirl flow can be generated within the second swirl chamber 116, and a LH2 curtain or envelope flow can be generated within the diluent injection portion 134 of the mixing chamber 128.

In some examples, the mixture ratio of the first fluid provided in the first swirl chamber 104 to the second fluid provided in the second swirl chamber 116 can be 2 to 3. In other words, the ratio of first fluid to second fluid provided by the first and second swirl chambers 104, 116, (not including the third fluid provided by the diluent injection portion 134), can be 2 to 3. In alternative examples, the mixture ratio of the first fluid and second fluid can be 5 to 8, 3 to 4, 1 to 1, or the like.

The swirl preburner 100 can further comprise one or more igniters positioned about the first and second swirl chamber exit ports 110, 122 at the first and second swirl chamber second ends 108, 120 to ignite the mixture of the first and second fluids flowing into the mixing cup 136. Having a mixture ratio of 2 to 3, or the like, of the first and second fluid can be desirable because such a ratio can make it easier to start ignition in the preburner, while injection of the third fluid can reduce the mixture ratio and thereby reduce the temperature supplied to downstream turbine blades.

Figure 5:
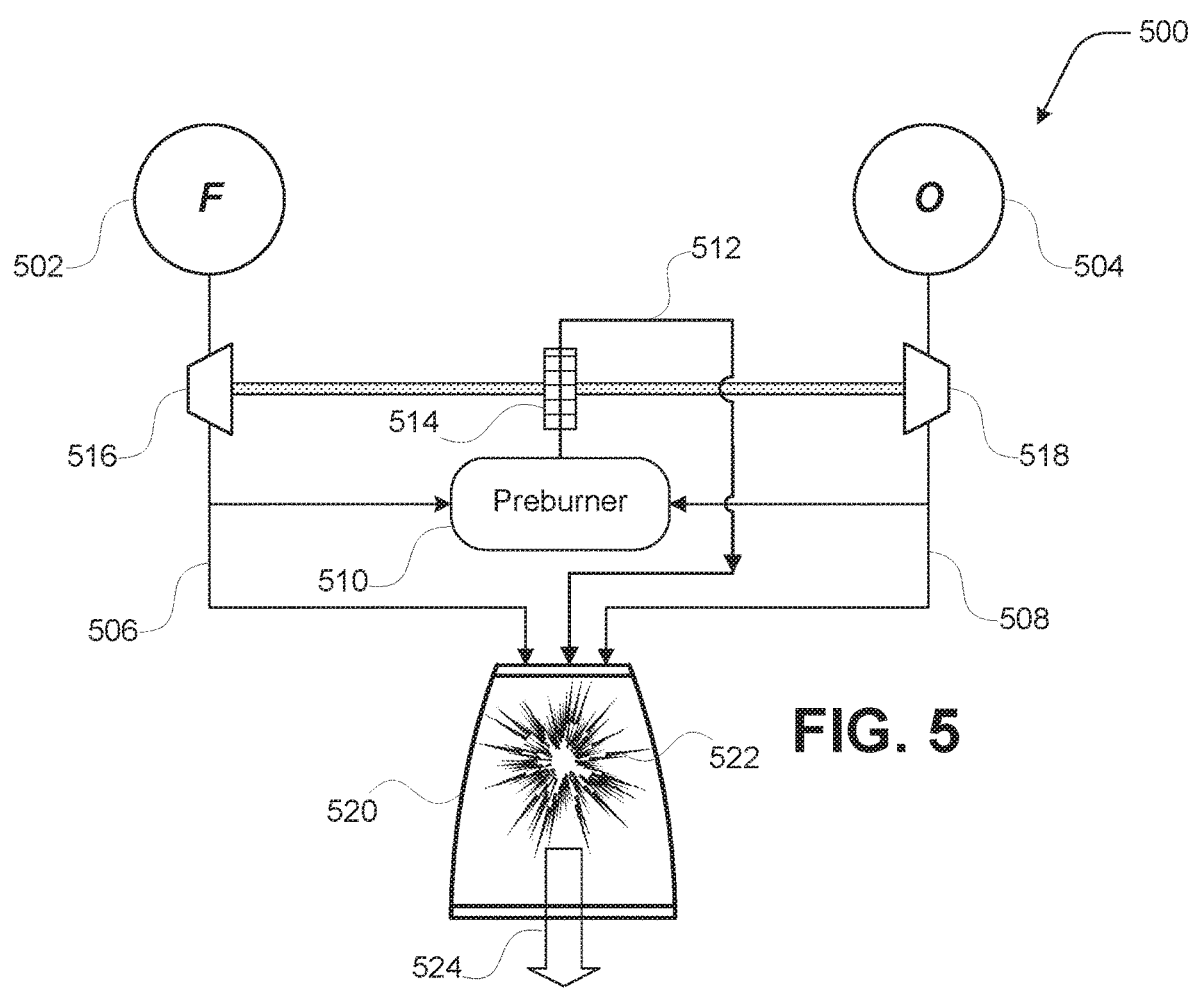
FIG. 5 is a block diagram of an example rocket engine system comprising a swirl preburner.

For example, in embodiments where the first fluid comprises LO2 and the second fluid and third fluid comprises LH2, a mixture ratio of 2 LO2 to 3 LH2 provided by the first and second swirl chambers 104, 116 into the mixing cup 136 can allow for easier ignition within the mixing cup 136, and with the addition of diluent LH2 (i.e., the third fluid), can dilute the ratio, which can reduce the temperature provided to turbines that are downstream of the swirl preburner 100 (see, e.g., FIG. 5). Such a reduced temperature at downstream components such as turbine blades can be desirable because reduced temperatures can decrease wear and tear on such components caused by high temperatures.

Additionally, swirl mixing of the first and second fluids via the first and second swirl chambers 104, 116 can provide improved mixing of the first and second fluids in the mixing cup 136, which can provide for combustion of the mixture of the first and second fluids within a more narrow temperature range. For example, where a mixture of the first and second fluids is inconsistent and not homogenous within a volume, combustion of such a mixture can include temperatures within a large range of temperatures. Where high temperatures are damaging to components of a rocket engine, including the swirl preburner 100, downstream turbines, and the like, keeping the temperature range of combustion of the fluids within the mixing cup 136 can be desirable for improving the working life of various components of a rocket engine system. Accordingly, improved (i.e., more homogenous mixing of the first and second fluids) can be desirable for improving the working life of components of a rocket engine by keeping combustion temperatures within a more narrow range compared to other preburner configurations.

For example, in some embodiments, it can be desirable to not expose the swirl preburner 100 or downstream turbines to temperatures above 2000° C. One way of limiting the exposure of components of the swirl preburner 100 to temperatures above 2000° C. is to combust the mixture of the first and second fluid within a sheet or envelope of the third fluid as discussed above. Where combustion of the first and second fluid in the mixing cup 136 is above 2000° C. (e.g., 3000° C. to 4000° C.) the mixing element 126 portions that define the mixing chamber 128 and mixing cup 136 can be insulated from such temperatures by the sheet or envelope of the third fluid generated by the diluent injection portion 134 of the mixing cup 136.

Also, addition of the third fluid to the combustion and mixture of the first and second fluid can decrease the temperature of the mixture and/or combustion, which can be desirable for components downstream of the swirl preburner 100. For example, where combustion of the first and second fluids begins at 3000° C. to 4000° C., addition of the third fluid can reduce the temperature to less than 2000° C. (e.g., to about 1200° C.), which can be desirable for downstream components such as turbines and the like.

Additionally, by reducing the temperature quickly, the length of tubing or other connecting structures between the swirl preburner 100 and downstream temperature-sensitive components can be reduced because less distance is required for temperature reduction. Reducing the length of such components can be desirable for reducing the size and mass of a rocket engine system comprising the swirl preburner 100.

Accordingly, in various embodiments, the swirl preburner 100 can provide for a low-mass preburner system, while also providing a robust start transient and a temperature profile that lengthens the life of components of a rocket engine system, including downstream turbine blades and the swirl preburner 100 itself.

In various examples, the first and second swirl chambers 104, 116 can provide improved mixing and atomization of fluids compared to other designs, which can allow for the length of the swirl preburner 100 to be shorter than such other designs. Accordingly, in some examples, the swirl preburner 100 configuration discussed herein can reduce the size and/or mass of the swirl preburner 100 compared to alternative designs, which can be desirable for providing lighter and smaller rocket engine systems that include the swirl preburner 100.

Additionally, while LH2 (a fuel) and LO2 (an oxidizer) are discussed in some examples, any other suitable combinations of fuel and oxidizer, single or multi-component fuel, single or multi-component oxidizer, or the like can used in alternative examples. For example, in further embodiments, a swirl preburner 100 can use one or more of ethylene oxide, hydrogen peroxide, nitromethane, perchloryl fluoride, nitrous oxide, LO2-kerosene, nitrogen tetroxide-hydrazine, analine-acid, JP-4-Acid, hydrogen peroxide-JP-4, hydrazine-acid, ammonia-nitrogen tetroxide, LO2-JP-4, LO2-alcohol, hydrazine-chlorine trifluoride, LO2-fluorine-JP-4, LO2-ozone-JP-4, LO2-hydrazine, fluorine-hydrogen, fluorine-ammonia, ozone-hydrogen, fluorine-diborane, and the like. Additionally, while various examples discuss use of liquid fluids, further examples can use any suitable gas and/or liquid fluids.

Turning to FIG. 2, a cross-sectional front view of a swirl preburner 200 of another example embodiment is illustrated. The swirl preburner 200 is shown comprising a central first swirl core 202 that defines a first swirl chamber 204. A first swirl chamber end 206 is shown defining a first swirl chamber exit port 208. In various embodiments, the first swirl core 202 defines a cylindrical first swirl chamber 204 having a diameter of $D1_2$. In various examples, a first swirling fluid flow can be generated within the first swirl chamber 204 and ejected from the first swirl chamber exit port 208 as discussed herein. For example, such a first swirling fluid flow generated within the first swirl chamber 204 can comprise LO2.

The swirl preburner 200 of FIG. 2 is shown further comprising a second swirl core 210 that defines a second swirl chamber 212. A second swirl chamber end 214 is shown defining a second swirl chamber exit port 216 in combination with the first swirl chamber end 206. In various embodiments, the second swirl core 210 defines a cylindrical-ring second swirl chamber 212 having a diameter of $D2_2$, with the width of the cylindrical-ring being $(D2_2-D1_2)/2$. In various examples, a second swirling fluid flow can be generated within the second swirl chamber 212 and ejected from the first swirl chamber exit port 216 as discussed herein. For example, such a second swirling fluid flow generated within the second swirl chamber 212 can comprise LH2.

The swirl preburner 200 of FIG. 2 is shown further comprising a mixing element 218 that defines a mixing chamber 220. A mixing chamber end 222 is shown defining a mixing cup 224. In various embodiments, the mixing chamber 220 defines a cylindrical mixing cup 224 having a diameter of $D3_2$. In various examples, a third fluid curtain or envelope flow can be generated within the mixing cup 224. For example, such a curtain or envelope of third fluid generated within the mixing cup 224 can comprise LH2.

As illustrated in FIG. 2, the first swirl core 202 can be nested within the second swirl core 210, with the first and second swirl core 202, 210 being nested within a portion of the mixing element 218. As discussed herein, the first and second swirl chambers 204, 212 and mixing chamber 220 can define respective diameters $D1_2$, $D2_2$ and $D3_2$, with $D1_2 < D2_2 < D3_2$. Additionally, first and second swirl chambers 204, 212 and mixing chamber 220 can be axial symmetric and/or have circular radial symmetry about a central axis that extends through the swirl preburner 200.

Figure 3:
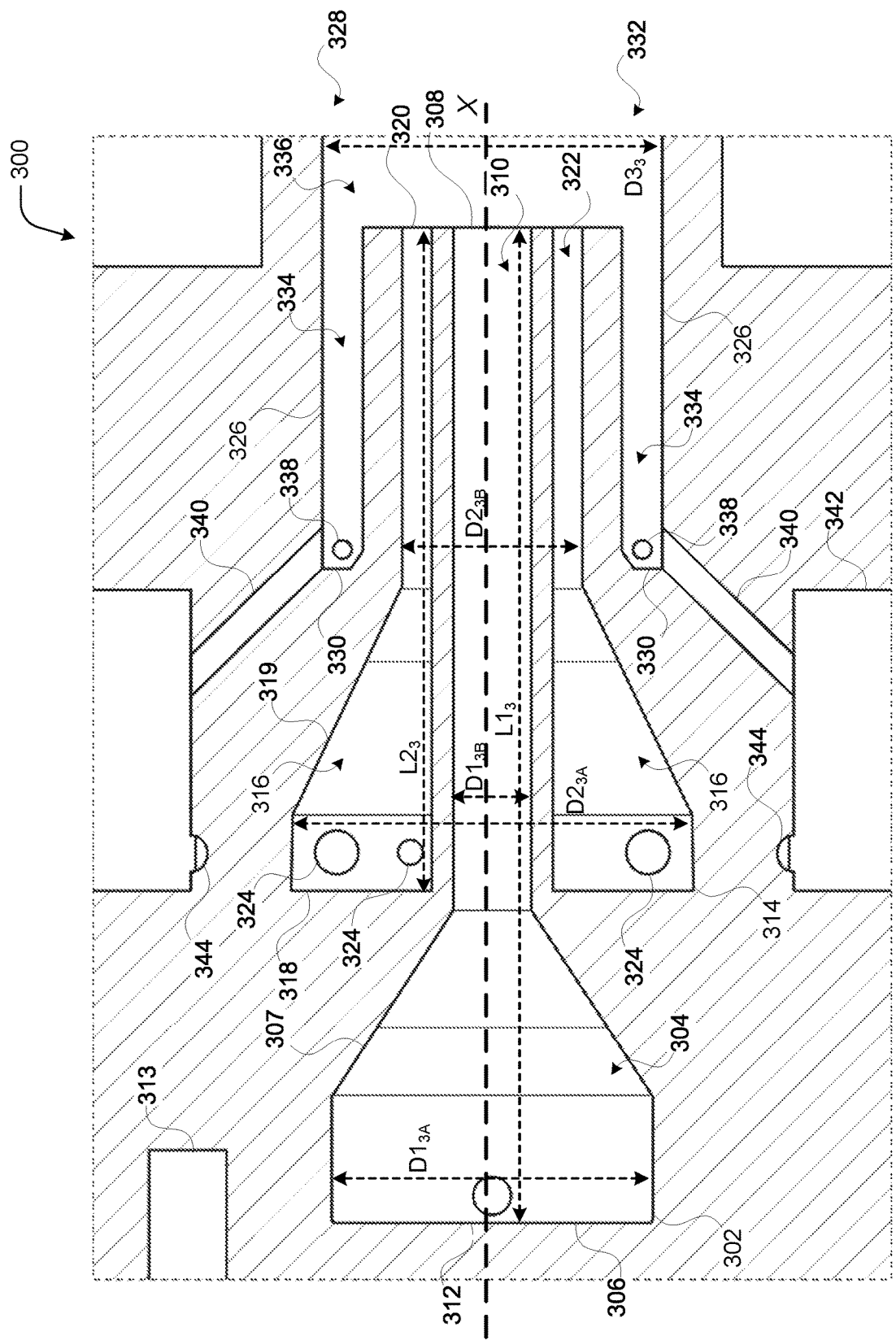
FIG. 3 is an example cross-sectional side view of a swirl preburner in accordance with an embodiment.

Turning to FIG. 3, a swirl preburner 300 is shown comprising a first swirl core 302 that defines a first swirl chamber 304 extending from a first swirl chamber first end 306 to a first swirl chamber second end 308 with a length of $L1_3$. The first swirl chamber 304 comprises a first swirl chamber exit port 310 at the first swirl chamber second end 308. In various embodiments, the first swirl core 302 defines an axially symmetric first swirl chamber 304 having a diameter of $D1_{3A}$ at the first swirl chamber first end 306 and a diameter of $D1_{3B}$ at the first swirl chamber second end 308. The first swirl chamber 304 can comprise a first swirl chamber taper portion 307 that transitions the diameter of the first swirl chamber 304 from the diameter of $D1_{3A}$ at the first swirl chamber first end 306 to the diameter of $D1_{3B}$ at the first swirl chamber second end 308. A plurality of first swirl chamber injection ports 312 can be defined by the first swirl core 302 and disposed at the first swirl chamber first end 306.

In various embodiments, a first fluid can be injected into the first swirl chamber 304 via the first swirl chamber injection ports 312, with the first swirl chamber injection ports 312 being configured to generate a swirl of the first fluid within the first swirl chamber 304 that propagates from the first swirl chamber first end 306 to the first swirl chamber second end 308 and out of the first swirl chamber exit port 310. In the example swirl preburner 300, the first swirl chamber injection ports 312 are disposed on a portion of the first swirl chamber first end 306 having a diameter of $D1_{3A}$. In some embodiments, the first fluid can comprise LO2.

The swirl preburner 300 is shown further comprising a second swirl core 314 that defines a second swirl chamber 316 extending from a second swirl chamber first end 318 to a second swirl chamber second end 320 with a length of $L2_3$. The second swirl chamber 316 comprises a second swirl chamber exit port 322 at the second swirl chamber second end 320. In various embodiments, the second swirl core 314 defines an axially-symmetric-ring second swirl chamber 316 having a maximum diameter of $D2_{3A}$ at the second swirl chamber first end 318 and a diameter of $D2_{3B}$ at the second swirl chamber second end 320. In some examples, the ratio of $L2_3/D2_{3B}$ can be within the range of 6.0 and 7.0, and in one example the ratio of $L2_3/D2_{3B}=6.4$.

The second swirl chamber 316 can comprise a second swirl chamber taper 319 that transitions the diameter of the second swirl chamber 316 from the diameter of $D2_{3A}$ at the second swirl chamber first end 318 to the diameter of $D2_{3B}$ at the second swirl chamber second end 320. A plurality of second swirl chamber injection ports 324 can be defined by the second swirl core 314 and disposed at the second swirl chamber first end 318.

Additionally, as shown in the example of FIG. 3, the first swirl chamber second end 308 and second swirl chamber second end 320 can be flush with each other and define a common face. The second swirl chamber 316 can extend about the first swirl chamber 304 from the first swirl chamber second end 308 toward first swirl chamber first end 306 the length of $L2_3$. Accordingly, the distance between the first swirl chamber first end 306 and the second swirl chamber first end 318 is a distance of $L1_3$-$L2_3$ with the first swirl chamber first end 306 not being encircled by the second swirl chamber 316.

As shown in this example swirl preburner 300, the maximum diameter $D1_{3A}$ and taper portion 307 of the first swirl chamber 304 are not surrounded by the second swirl chamber 316. Additionally, the second swirl chamber 316 exclusively surrounds the portion of the first swirl chamber 304 having the minimum diameter of $D1_{3B}$. Additionally, $D2_{3A}$>$D1_{3A}$>$D2_{3B}$>$D1_{3B}$ in the example swirl preburner of FIG. 3.

In some examples, the ratio of $L1_3/D1_{3B}$ can be within the range of 8.0 and 7.0, and in one example the ratio of $L1_3/D1_{3B}$=7.5.

A plurality of second swirl chamber injection ports 324 can be defined by the second swirl core 314 and disposed at the second swirl chamber first end 318. In various embodiments, a second fluid can be injected into the second swirl chamber 316 via the second swirl chamber injection ports 324, with the second swirl chamber injection ports 324 being configured to generate a swirl of the second fluid within the second swirl chamber 316 that propagates from the second swirl chamber first end 318 to the second swirl chamber second end 320 and out of the second swirl chamber exit port 322. In the example swirl preburner 300, the second swirl chamber injection ports 324 are disposed on a portion of the second swirl chamber first end 318 having a diameter of $D2_{3A}$. In some embodiments, the second fluid can comprise LH2.

In various embodiments, a swirl of the first and/or second fluid can be generated by configuration of the one or more respective first swirl chamber injection ports 312 and second swirl chamber injection ports 324, which can include holes that provide a tangential feed of fluid into the respective first and second swirl chambers 304, 316. For example, one or more first swirl chamber injection ports 312 can be defined by the first swirl core 302, with first swirl chamber injection ports 312 providing a feed of the first fluid tangential to the internal surface of the first swirl core 302 defining the first swirl chamber 304. Such a configuration can generate a swirl or helical flow of the first fluid within the first swirl chamber 304 that propagates from the one or more first swirl chamber injection ports 312 at the first swirl chamber first end 306 toward the first swirl chamber second end 308 and out the first swirl chamber exit port 310.

The first swirl core 302 can comprise one or any suitable plurality of first swirl chamber injection ports 312. In some examples, the first swirl core 302 can comprise two to eight first swirl chamber injection ports 312. In one example, the first swirl core 302 can comprise three first swirl chamber injection ports 312. In various examples, a plurality of first swirl chamber injection ports 312 can be symmetrically disposed and/or equally spaced about a circumference of the first swirl chamber 304 at the first swirl chamber first end 306. In some examples, the first swirl chamber injection ports 312 can be disposed in a common plane about a circumference of the first swirl chamber 304 and/or can be disposed symmetrically about a given plane.

Similarly, one or more second swirl chamber injection ports 324 can be defined by the second swirl core 314, with second swirl chamber injection ports 324 providing a feed of the second fluid tangential to the internal surface of the second swirl core 314 defining the second swirl chamber 316. Such a configuration can generate a swirl or helical flow of the second fluid within the second swirl chamber 316 that propagates from the one or more second swirl chamber injection ports 324 at the second swirl chamber first end 318 toward the second swirl chamber second end 320 and out the second swirl chamber exit port 322.

The second swirl core 314 can comprise one or any suitable plurality of second swirl chamber injection ports 324. In some examples, the second swirl core 314 can comprise four to sixteen second swirl chamber injection ports 324. In one example, the second swirl core 314 can comprise six second swirl chamber injection ports 324. In various examples, a plurality of second swirl chamber injection ports 324 can be symmetrically disposed and/or equally spaced about a circumference of the second swirl chamber 316 at the second swirl chamber first end 318. In some examples, the second swirl chamber injection ports 324 can be disposed in a common plane about a circumference of the second swirl chamber 316 and/or can be disposed symmetrically about a given plane.

The swirl preburner 300 can further comprise a mixing element 326 that defines a mixing chamber 328, with the mixing chamber 328 extending from a mixing chamber first end 330 to a mixing chamber second end 332. The mixing chamber 328 comprises a diluent injection portion 334 and a mixing cup 336. The mixing cup 336 defines a diameter of $D3_3$. The mixing element 326 further comprises a plurality of diluent injection ports 338 defined by the mixing element 326 at the mixing chamber first end 330.

The diluent injection ports 338 can be fed and receive the third fluid (e.g., LH2) via respective diluent feeding tubes 340 that extend from and communicate with one or more fluid reservoirs 342. Additionally, the second swirl chamber injection ports 324 can be fed and receive the second fluid (e.g., LH2) via second swirl chamber feeding tubes 344 that also communicate with the one or more fluid reservoirs 342.

Note that in an effort to simplify the present disclosure, the entirety of the second swirl chamber feeding tubes 344 is not shown in the cross-sectional view of FIG. 3, including all portions that form the connection between and allows the second fluid to pass from the one or more fluid reservoirs 342 to the respective second swirl chamber injection ports 324. Additionally, the one or more fluid reservoirs 342 can similarly be linked. Accordingly, the fluid reservoirs 342 shown in FIG. 3 may actually be portions of a single fluid reservoir 342, but given the nature of the cross-sectional view of FIG. 3, such connections may not be illustrated for purposes of clarity of FIG. 3. Additionally, while second and third fluids are discussed in some examples of the present disclosure, in various examples the first and second fluids can be the same fluid (e.g., LH2). Accordingly, in some embodiments, the one or more fluid reservoirs 342 can feed the same fluid (e.g., LH2) to both the second swirl chamber 316 and the mixing chamber 328.

Similarly, the first chamber injection ports 312 can be fed and receive the first fluid (e.g., LO2), via a first fluid source 313 and as discussed above, feeding tubes or other structures that communicate the first fluid to the first chamber injection ports 312 are not illustrated in FIG. 3 due to the nature of the cross-sectional view and in an effort to simplify the present disclosure.

In various embodiments, the third fluid can be injected into the diluent injection portion 334 of the mixing chamber 328 via the diluent injection ports 338, with the diluent injection ports 338 being configured to generate an envelope of the third fluid within the diluent injection portion 334 that propagates from the mixing chamber first end 330 and into the mixing cup 336 toward the mixing chamber second end 332.

In various examples, the diluent injection portion 334 of the mixing chamber 328 defines a cylindrical ring with the diluent injection portion 334 encircling the first and second swirl chambers 304, 316 (see e.g., FIG. 2). Accordingly, a portion of the second swirl core 314 can define a portion of the diluent injection portion 334 of the mixing chamber 328.

As illustrated in FIG. 3, the first swirl core 302 can be nested within the second swirl core 314, with the first and second swirl core 302, 314 being nested within a portion of the mixing element 326. Additionally, first and second swirl chambers 304, 316 and mixing chamber 328 can be axial symmetric and/or have circular radial symmetry about axis X that extends through the swirl preburner 300.

Swirling flows of first and second fluids can be respectively generated in the first and second swirl chambers 304, 316 as discussed above, and these respective flows of the first and second fluids can exit the first and second swirl chambers 304, 316 via the first and second swirl chamber exit ports 310, 322 into the mixing cup 336 of the mixing chamber 328. The first and second fluid swirl flows can be surrounded by an envelope of the third fluid coming from the diluent injection portion 334 and propagate toward the mixing chamber second end 332.

As discussed herein, the swirling flows of the first and second fluid can be generated by the angle, orientation, nozzle shape, or other configuration of the first and second swirl chamber injection ports 312, 324, which generates a respective fluid flow that in some examples makes at least a full rotation about the circumference of the respective first and second swirl chambers 304, 316. In contrast, the diluent injection ports 338 can be configured to generate a flow of the third fluid from the mixing chamber first end 330 toward the mixing chamber second end 332 without a swirling flow, which in some examples can include a linear flow or a flow having a swirl flow that makes less than a full rotation about the circumference of the mixing chamber 328, including less than a half rotation, less than a quarter rotation, less than an eighth rotation, less than a sixteenth rotation, and the like.

In some examples, the mixing chamber 328 can comprise six to thirty-two diluent injection ports 338. In one example, the mixing chamber 328 can comprise twelve diluent injection ports 338. In various examples, a plurality of diluent injection ports 338 can be symmetrically disposed and/or equally spaced about a circumference of the mixing chamber 328 at the mixing chamber first end 330. In some examples, the diluent injection ports 338 can be disposed in a common plane about a circumference of the mixing chamber 328 and/or can be disposed symmetrically about a given plane. As discussed above, given the nature of the cross-sectional view of FIG. 3 all injection ports 312, 324, 328 may not be illustrated, so the example view of FIG. 3, should not be considered to be limiting.

Figure 4:
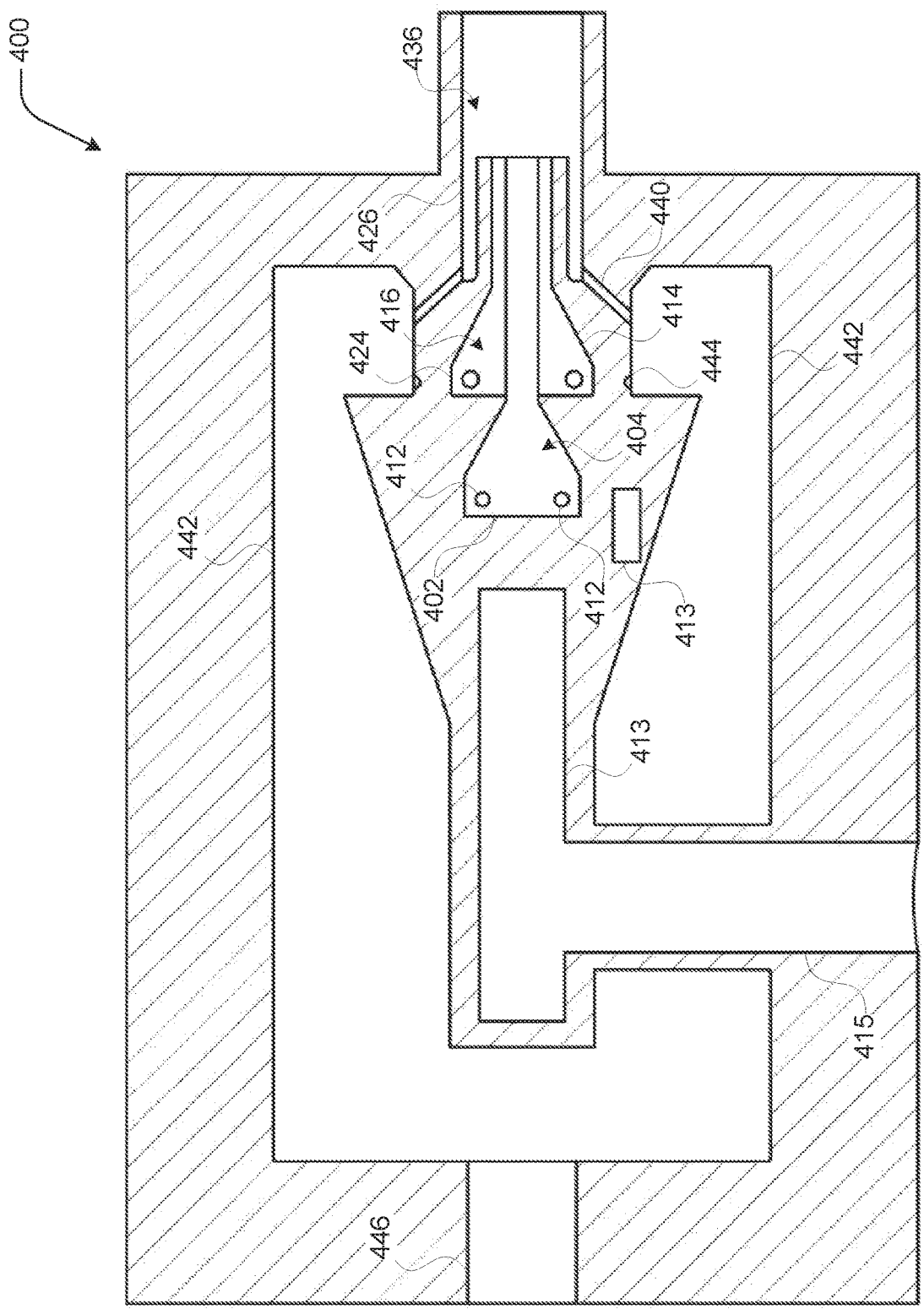
FIG. 4 is an example cross-sectional side view of a swirl preburner assembly in accordance with an embodiment.

Turning to FIG. 4, an example swirl preburner system 400 is illustrated. A first swirl core 402 can be nested within a second swirl core 414, with the first and second swirl cores 402, 414 being nested within a portion of a mixing element 426. The first and second swirl cores 402, 414 and mixing element 426 can define respective first and second swirl chambers 404, 416 and a mixing chamber 436.

The mixing chamber 436 can be fed and receive the third fluid (e.g., LH2) via respective diluent feeding tubes 440 that extend from and communicate with one or more fluid reservoirs 442 fed by a fluid source 446. Additionally, second swirl chamber injection ports 424 can be fed and receive the second fluid (e.g., LH2) via second swirl chamber feeding tubes 444 that also communicate with the one or more fluid reservoirs 442.

Note that in an effort to simplify the present disclosure, the entirety of the second swirl chamber feeding tubes 444 is not shown in the cross-sectional view of FIG. 4, including all portions that form the connection between and allows the second fluid to pass from the one or more fluid reservoirs 442 to the respective second swirl chamber injection ports 424. Additionally, the one or more fluid reservoirs 442 can similarly be linked. Accordingly, the fluid reservoirs 442 shown in FIG. 4 may actually be portions of a single fluid reservoir 442, but given the nature of the cross-sectional view of FIG. 4, such connections may not be illustrated for purposes of clarity of FIG. 4. Additionally, while second and third fluids are discussed in some examples of the present disclosure, in various examples the first and second fluids can be the same fluid (e.g., LH2). Accordingly, in some embodiments, the one or more fluid reservoirs 442 can feed the same fluid (e.g., LH2) to both the second swirl chamber 416 and the mixing chamber 428.

Similarly, first chamber injection ports 412 can be fed and receive first fluid (e.g., LO2), via a first fluid feeding architecture 413 that is fed from a first fluid source 415 and, as discussed above, feeding tubes or other structures that communicate the first fluid to the first chamber injection ports 412 is not illustrated in FIG. 4 due to the nature of the cross-sectional view and in an effort to simplify the present disclosure.

In various embodiments, the entirety of the swirl preburner 400 can be made via additive manufacturing. For example, in some embodiments, the swirl preburner 400 can be made via additive manufacturing with materials including nickel, copper, or the like. Generating a swirl preburner 400 via additive manufacturing can be desirable because such manufacturing methods can allow for generation of structures that are impossible to generate via other manufacturing methods.

FIG. 5 is a block diagram of an example rocket engine system 500 comprising a preburner 510, which in some examples can comprise the swirl preburner 100, 200, 300 of FIGS. 1-3 or the swirl preburner system 400 of FIG. 4. The rocket engine system 500 is shown comprising a fuel reservoir 502 and an oxidizer reservoir 504 with the respective fuel lines 506 and oxidizer lines 508 carrying fuel and oxidizer to the preburner 510. In some embodiments, the fuel can comprise LH2 and the oxidizer can comprise LO2. However, further embodiments can include any suitable fuel-oxidizer pair including fuel-oxidizer pairs discussed herein.

A fuel-rich mixture of fuel and oxidizer can be generated and combusted in the preburner 510, and propellant-rich exhaust fluid can leave the preburner via exhaust lines 512. For example, combustion in the preburner 510 can be off from stoichiometric conditions, meaning that in addition to combustion products, propellant (e.g., fuel or oxidizer) can be left over from the combustion in the preburner 510.

Combustion exhaust from the preburner 510 can drive a turbine 514 that in turn drives a fuel pump 516 and an oxidizer pump. The fuel pump 516 can pump fuel from the fuel reservoir 502 and through the fuel lines 506 to the preburner 510 and to a combustion chamber 520. The oxidizer pump 518 can pump oxidizer from the oxidizer reservoir 504 and through the oxidizer lines 508 to the preburner 510 and to the combustion chamber 520.

Fuel via the fuel lines 506, oxidizer via the oxidizer lines 508, and propellant-rich exhaust from the preburner 510 via the exhaust lines 512 can be ignited in the combustion chamber 520 to generate a combustion 522 which can generate thrust 524 which propels the rocket engine 500.

Although one example of a rocket engine system 500 having a preburner 510 is shown in FIG. 5, other suitable rocket engine configurations are within the scope of the present disclosure. For example, in one embodiment, a rocket engine system can comprise a plurality of preburners 510 which can be configured to drive a respective pump (e.g., a fuel and oxidizer pump 516, 518). In a further example, fuel and/or oxidizer can be pumped around the body of a combustion chamber 520 to act as a coolant and/or to heat the fuel and/or oxidizer. In some examples, oxidizer can be provided by a high pressure impeller on the oxidizer pump 518. In some examples, fuel can be provided by a main stage of the fuel pump 516. Various other staged combustion cycle engine configurations can use one or more preburners as described herein.

Figure 6:
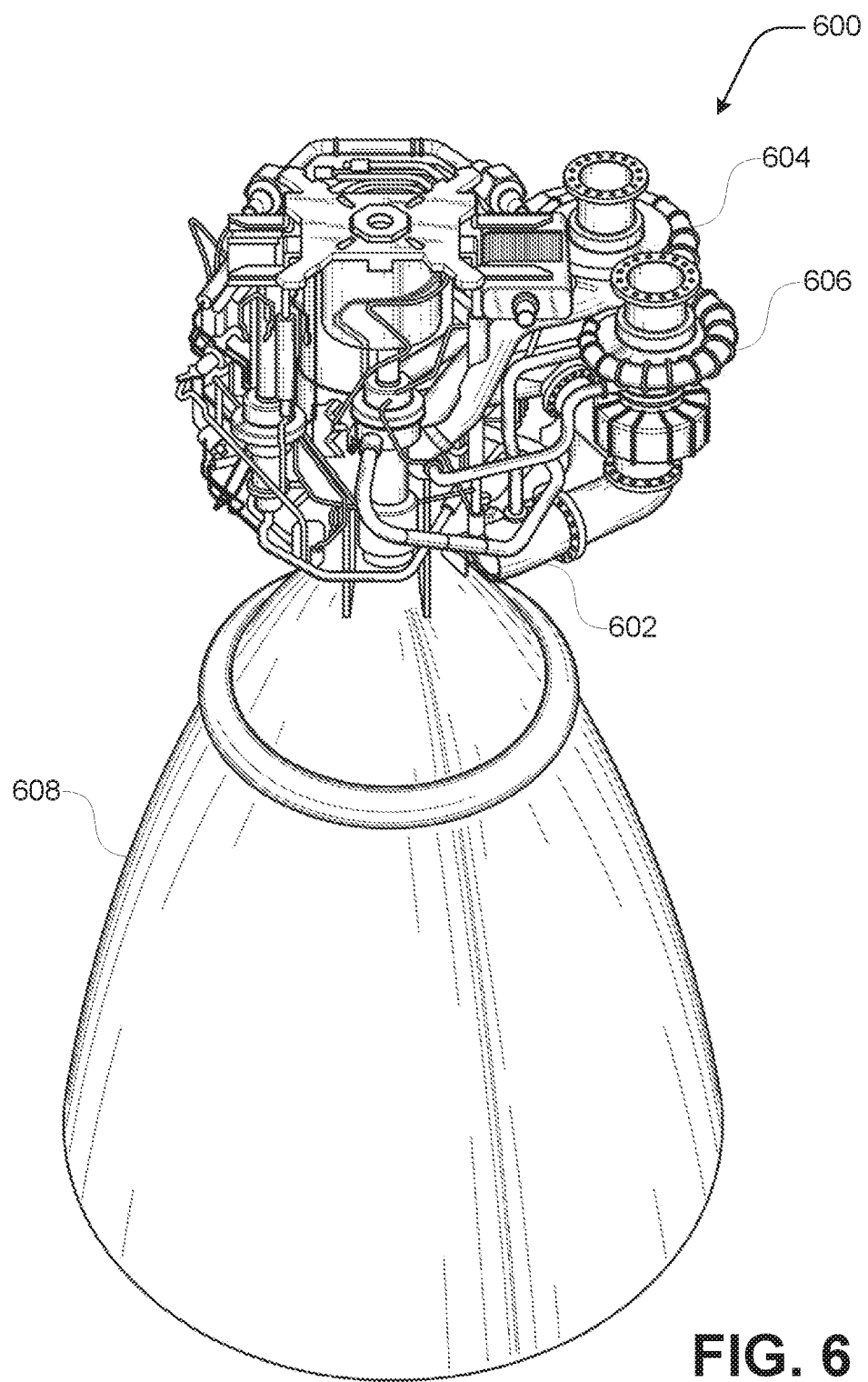
FIG. 6 is a perspective view of an example rocket engine system comprising a swirl preburner, in accordance with an embodiment.
Figure 7:
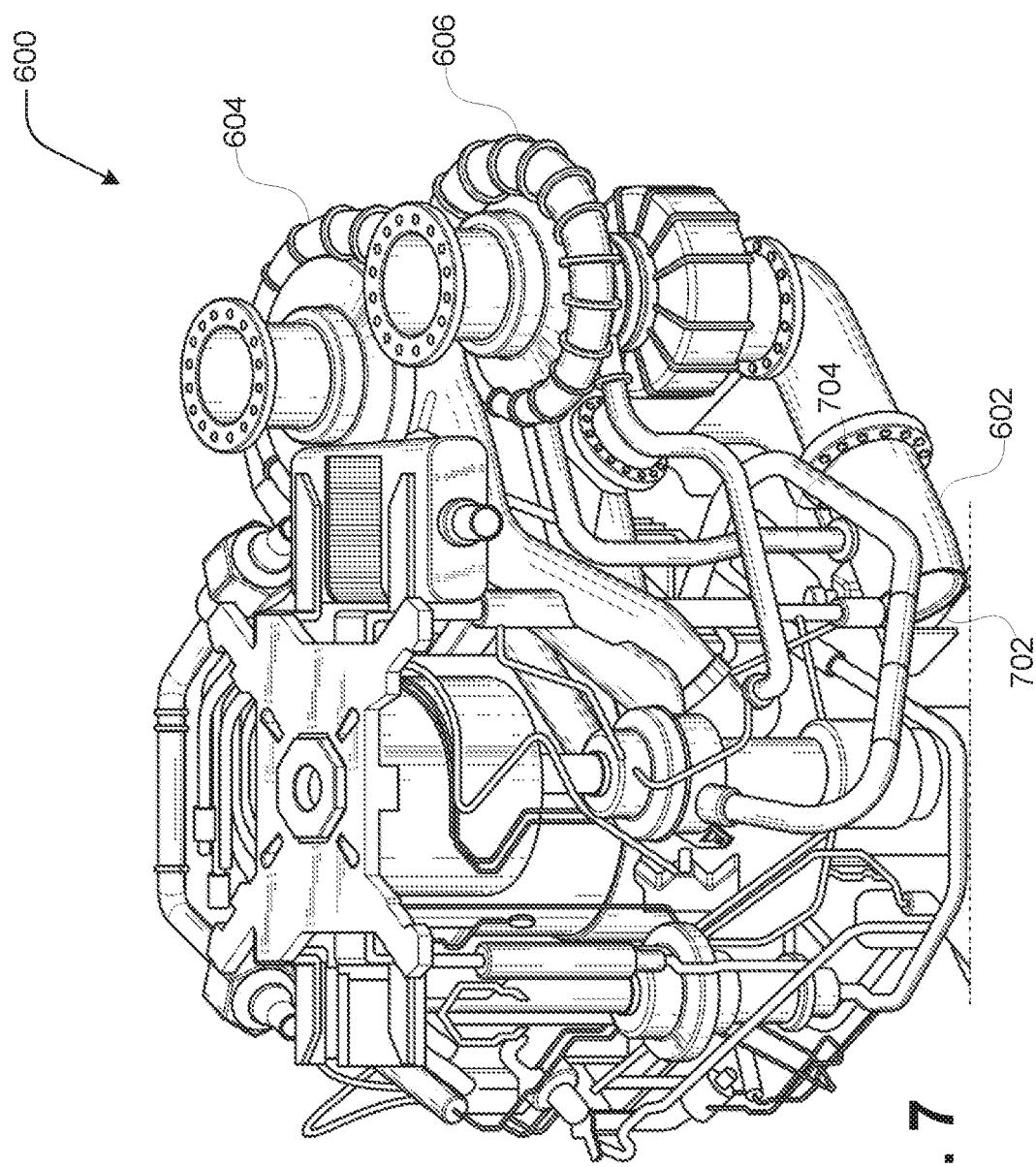
FIG. 7 is a close-up perspective of a portion of the example rocket engine system of FIG. 6.

Turning to FIGS. 6 and 7, another example of a rocket engine system 600 is illustrated, with FIG. 7 being a close-up view of a portion of the illustration in FIG. 6. The rocket engine system 600 is shown comprising a preburner system 602, which drives a first and second pump 604, 606, which provides fuel and oxidizer to a combustion chamber 608. As shown in FIG. 7, the preburner system 602 can be fed by a first fluid source 702 and a second fluid source 704. For example, in one embodiment, the preburner system 602 can comprise the swirl preburner 100, 200, 300 of FIGS. 1-3 or the swirl preburner system 400 of FIG. 4.

In some examples, the preburner system 602 can have an operating pressure within the rage of 2000 psi<Pc<2200 psi, and in one example, Pc=2105 psi. In some examples, the preburner system 602 can operate within the range of 1650° C.-1750° C.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process of operating and controlling a preburner, a preburner system, or a rocket engine, such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU executes some of the instructions while a graphics processor unit executes other instructions. In an embodiment, different components of a computer system have separate processors, and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system that implements an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
    introducing a first fluid into a first swirl chamber defined by a first swirl core of a swirl preburner, the first fluid introduced at a first swirl chamber first end and generating a first fluid flow propagating toward a first swirl chamber second end, the first swirl chamber second end defining a first swirl chamber exit port, the first fluid flow swirling within the first swirl chamber from the first swirl chamber first end to the first swirl chamber second end, the first swirl chamber comprising a first swirl chamber taper portion that transitions a diameter of the first swirl chamber from a first larger diameter at the first swirl chamber first end to a second smaller diameter at the first swirl chamber second end that is smaller than the first larger diameter;
    introducing a second fluid into a second swirl chamber defined by a second swirl core of the swirl preburner, the second fluid introduced at a second swirl chamber first end and generating a second fluid flow propagating toward a second swirl chamber second end, the second swirl chamber second end defining a second swirl chamber exit port, the second fluid flow swirling within the second swirl chamber from the second swirl chamber first end to the second swirl chamber second end, the second swirl chamber surrounding a portion of the first swirl chamber including at least the first swirl chamber second end being nested within the second swirl chamber, the second swirl chamber comprising a second swirl chamber taper portion that transitions a diameter of the second swirl chamber from a third larger diameter at the second swirl chamber first end to a fourth smaller diameter at the second swirl chamber second end that is smaller than the third larger diameter, the first larger diameter being smaller than the third larger diameter and larger than the fourth smaller diameter;
    introducing a third fluid into a mixing chamber defined by a mixing element, the mixing chamber surrounding a portion of the first and second swirl chambers at least including the first swirl chamber second end and the second swirl chamber second end, with the first and second fluid flow leaving the first and second swirl chambers into the mixing chamber and mixing within the mixing chamber; and
    igniting at least the first fluid flow and the second fluid flow within the mixing chamber to generate a combustion that drives one or more pumps that pump fuel or oxidizer to a propulsive combustion chamber of a rocket engine.

2. The method of claim 1, wherein the first fluid comprises liquid oxygen, and wherein the second fluid and third fluid comprise liquid hydrogen.

3. The method of claim 1, wherein introducing the third fluid into the mixing chamber includes generating an envelope of third fluid flow that surrounds the first and second fluid flow leaving the first and second swirl chambers at the first and second swirl chamber second ends.

4. The method of claim 1, further comprising directing exhaust generated by the combustion of at least the first and second fluid to a turbine, the turbine powering the one or more pumps that at least introduces the first fluid to the first swirl chamber or introduces the second fluid to the second fluid chamber.

5. The method of claim 1, wherein the first swirl chamber is axial symmetric about an axis X, wherein the second swirl chamber is axial symmetric about the axis X, and wherein the mixing chamber is axial symmetric about the axis X.

6. The method of claim 1, wherein introducing the first fluid into the first swirl chamber comprises injecting the first fluid into the first swirl chamber via a plurality of first swirl chamber injection ports disposed at the first swirl chamber first end; and wherein introducing the second fluid into the second swirl chamber comprises injecting the second fluid into the second swirl chamber via a plurality of second swirl chamber injection ports disposed at the second swirl chamber first end.

7. The method of claim 6, wherein injecting the first fluid into the first swirl chamber via the plurality of first swirl chamber injection ports generates the first fluid flow swirling within the first swirl chamber from the first swirl chamber first end to the first swirl chamber second end, and
wherein injecting the second fluid into the second swirl chamber via the plurality of second swirl chamber injection ports generates the second fluid flow swirling within the second swirl chamber from the second swirl chamber first end to the second swirl chamber second end.

8. A swirl preburner comprising:
a first swirl core defining a first swirl chamber having a first swirl chamber first end and a first swirl chamber second end, the first swirl chamber second end defining a first swirl chamber exit port, the first swirl chamber comprising a first swirl chamber taper portion that transitions a diameter of the first swirl chamber from a first larger diameter at the first swirl chamber first end to a second smaller diameter at the first swirl chamber second end that is smaller than the first larger diameter;
a second swirl core defining a second swirl chamber having a second swirl chamber first end and a second swirl chamber second end, the second swirl chamber second end defining a second swirl chamber exit port, the second swirl chamber surrounding a portion of the first swirl chamber including at least the first swirl chamber second end, the second swirl chamber comprising a second swirl chamber taper portion that transitions a diameter of the second swirl chamber from a third larger diameter at the second swirl chamber first end to a fourth smaller diameter at the second swirl chamber second end that is smaller than the third larger diameter, the first larger diameter being smaller than the third larger diameter and larger than the fourth smaller diameter; and
a mixing element defining a mixing chamber, the mixing chamber surrounding a portion of the first and second swirl chamber at least including the first swirl chamber second end and the second swirl chamber second end, wherein the swirl preburner drives a pump that pumps a fuel or oxidizer to a propulsive combustion chamber of a rocket engine.

9. The swirl preburner of claim 8, wherein the first swirl chamber tapers from a first larger diameter at the first swirl chamber first end to a second smaller diameter at the first swirl chamber second end.

10. The swirl preburner of claim 8, wherein the second swirl chamber tapers from a first larger diameter at the second swirl chamber first end to a second smaller diameter at the second swirl chamber second end.

11. The swirl preburner of claim 8, wherein the first swirl chamber comprises a plurality of first swirl chamber injection ports disposed at the first swirl chamber first end configured to tangentially feed a first fluid into the first swirl chamber at a tangent of a circumference of the first swirl chamber.

12. The swirl preburner of claim 8, wherein the second swirl chamber comprises a plurality of second swirl chamber injection ports disposed at the second swirl chamber first end configured to tangentially feed a second fluid into the second swirl chamber.

13. The swirl preburner of claim 8, wherein the mixing chamber comprises a mixing cup portion and a diluent injection portion.

14. A preburner comprising:
a first core defining a first chamber having a first swirl chamber first end and a first swirl chamber second end, the first swirl chamber comprising a first swirl chamber taper portion that transitions a diameter of the first swirl chamber from a first diameter at the first swirl chamber first end to a second smaller diameter at the first swirl chamber second end that is smaller than the first diameter;
a second core defining a second swirl chamber having a second swirl chamber first end and a second swirl chamber second end, the second swirl chamber comprising a second swirl chamber taper portion that transitions a diameter of the second swirl chamber from a third diameter at the second swirl chamber first end to a fourth smaller diameter at the second swirl chamber second end that is smaller than the third diameter, the first diameter being smaller than the third diameter and larger than the fourth smaller diameter; and
a mixing element defining a mixing chamber, the mixing chamber surrounding a portion of the first and second chamber at least including the first chamber second end and the second chamber second end,
wherein the preburner is disposed downstream of a turbine that drives at least one fluid pump that pumps fluid to at least one of the first core, second core, and mixing element.

15. The preburner of claim 14, wherein the first chamber second end defines a first chamber exit port, and wherein the second chamber second end defines a second chamber exit port that defined a common face with the first chamber exit port.

16. The preburner of claim 14, wherein the second chamber surrounds a portion of the first chamber including at least the first chamber second end.

17. The preburner of claim 14, wherein the first chamber has circular radial symmetry about an axis X, and wherein the second chamber has circular radial symmetry about the axis X.

18. The preburner of claim 14, wherein a ratio of a first length of the first chamber to a first diameter of the first chamber is within the range of 8.0 to 7.0 and wherein a ratio of a second length of the second chamber to a second diameter of the second chamber is within the range of 6.0 to 7.0.

19. The preburner of claim 14, wherein the second chamber defines a cylindrical-ring that surrounds the first chamber.

20. The preburner of claim 14, wherein the mixing chamber defines a cylindrical-ring that surrounds at least a portion of the first chamber and second chamber.

* * * * *